US008593264B2

(12) United States Patent
Umezawa et al.

(10) Patent No.: US 8,593,264 B2
(45) Date of Patent: Nov. 26, 2013

(54) REMOTE LIGHTING CONTROL SYSTEM

(75) Inventors: Yoshihisa Umezawa, Konosu (JP); Ichirou Terayama, Konosu (JP); Masakazu Ikeda, Warabi (JP); Yusuke Tainaka, Warabi (JP)

(73) Assignees: Eye Lighting Systems Corporation, Minato-ku, Tokyo (JP); Nippon Antenna Co., Ltd., Arakawa-ku, Tokyo (JP)

( * ) Notice: Subject to any disclaimer, the term of this patent is extended or adjusted under 35 U.S.C. 154(b) by 780 days.

(21) Appl. No.: 12/716,310

(22) Filed: Mar. 3, 2010

(65) Prior Publication Data

US 2010/0259193 A1 Oct. 14, 2010

(30) Foreign Application Priority Data

Apr. 9, 2009 (JP) ................................ 2009-095197

(51) Int. Cl.
*H05B 41/36* (2006.01)
*G05B 23/02* (2006.01)

(52) U.S. Cl.
USPC ........................................ 340/12.32; 340/3.5

(58) Field of Classification Search
USPC ............ 340/3.1, 3.9, 4.11, 4.2, 4.21, 5.1, 7.1, 340/7.2, 7.32, 2.24, 3.5, 4.31, 9.16, 10.42, 340/12.23, 12.26, 12.32, 539.13
See application file for complete search history.

(56) References Cited

U.S. PATENT DOCUMENTS 5,751,220 A * 5/1998 Ghaffari ..................... 340/12.31
7,880,638 B2 * 2/2011 Veskovic et al. ............... 340/4.3

FOREIGN PATENT DOCUMENTS

| | | |
|---|---|---|
| JP | 08-130096 | 5/1996 |
| JP | 10-208888 | 8/1998 |
| JP | 10-241877 | 9/1998 |
| JP | 2002-75683 | 3/2002 |
| JP | 2002-260883 | 9/2002 |
| JP | 2003-257678 | 9/2003 |
| JP | 2005-116506 | 4/2005 |
| JP | 2005-129365 | 5/2005 |
| JP | 2006-092917 | 4/2006 |
| JP | 2008-281679 | 11/2008 |

OTHER PUBLICATIONS

Japanese Patent Abstract for Publication No. 2002-075683 published Mar. 15, 2002, ten pages.
Patent Abstracts of Japan, Publication No. 2005-116506, 29 pages.

(Continued)

*Primary Examiner* — Jennifer Mehmood
*Assistant Examiner* — Yong Hang Jiang
(74) *Attorney, Agent, or Firm* — Rankin, Hill & Clark LLP

(57) ABSTRACT

A remote lighting control system is for remote lighting control of a plurality of discharge lamps. This system has the installed electronic ballasts of each discharge lamp. Each electronic ballast has a transceiver and a controller, the transceiver exchanges control information with the controller. The control command contains the identifiable information to specify one of a plurality of electronic ballasts. When the transmitter is received the control command, the transceiver transfers the received control command to other electronic ballasts further. Moreover, if the control command is the one that the identifiable information specifies own ballasts, the control information based on the received control command is send to own controller, and the controller control the discharge lamp. According to this system, when a lot of lamps was arranged the factory etc. comparatively widely, the user's remote control is not limited to the narrow scope.

13 Claims, 5 Drawing Sheets

(56) References Cited

OTHER PUBLICATIONS

Patent Abstracts of Japan, Publication No. 2008-281679, 7 pages.
Patent Abstracts of Japan, Publication No. 10-241877, 12 pages.
Patent Abstracts of Japan, Publication No. 10-208888, 16 pages.
Patent Abstracts of Japan, Publication No. 2002-260883, 8 pages.
Patent Abstracts of Japan, Publication No. 2003-257678, 11 pages.
Patent Abstracts of Japan, Publication No. 2006-092917, 29 pages.
Patent Abstracts of Japan, Publication No. 2005-129365, 9 pages.
Patent Abstracts of Japan, Publication No. 08-130096, 12 pages.

* cited by examiner

REMOTE LIGHTING CONTROL SYSTEM

RELATED APPLICATIONS

This application claims the priority of Japanese Patent Application No. 2009-095197 filed on Apr. 28, 2009, which are incorporated herein by reference.

BACKGROUND OF THE INVENTION

1. Field of the Invention

The present invention relates to remote control systems for a plurality of discharge lamps placed in a relatively wide area such as a factory or a shopping mall.

2. Prior Art

In one conventionally known control system for a plurality of discharge lamps, a control panel and electronic ballasts provided respectively for the plurality of discharge lamps are connected by wires (Japanese laid-open disclosure public patent bulletin No. 2002-75683).

Another known system uses a remote controller 116 that can send an infrared control signal for remote control of a control panel 106, as shown in FIG. 6. The control panel 106 has an infrared light receiving unit 114 and turns on each discharge lamp 104 through an electronic ballast 110 on the basis of a received control signal. In this wireless system, the control signal sent from the remote controller 116 is received by the light receiving unit 114 and transmitted to the control panel 106 connected to the light receiving unit 114 by a wire. The control signal is then transmitted to the electronic ballast 110 connected to the control panel 106 by a wire.

In the conventional system disclosed in Japanese laid-open disclosure public patent bulletin No. 2002-75683, the control panel and the electronic ballasts are connected by signal lines. Installation of the signal lines takes a great deal of labor and cost. Since the control panel is not portable, the operator is required great care to go to the control panel to control the discharge lamps.

The remote control system using the remote controller 116 for operating the control panel 106 as shown in FIG. 6 still uses signal lines to connect the light receiving unit 114 to the control panel 106 and to connect the control panel 106 to the electronic ballasts 110, so installing the signal lines still takes a great deal of labor and cost.

Since the light receiving unit 114 is fixed and has a limited indoor infrared communication range of several tens of meters, the range of the remote controller 116 is limited to a comparatively small communication area around the light receiving unit 114. Still more improvement in operation has been required to enable centralized control of the plurality of discharge lamps 104 placed in a relatively wide area such as a factory or a shopping mall. Systems that transmit a control signals by wires, such as the system disclosed in Japanese laid-open disclosure public patent bulletin No, 2002-75683, have another restriction on the arrangement of discharge lamps in a relatively wide area such as a factory because the length of the signal lines is limited to several tens of meters.

SUMMARY OF THE INVENTION

It is an object of the present invention to provide, even if a number of discharge lamps are placed in a relatively wide area such as a factory, a remote lighting control system that does not require the labor of installing signal lines, provides a wide enough range for remote control and control status confirmation by the user, and allows the plurality of discharge lamps to be placed without restrictions.

To solve the above-described problems, the inventors provide a transceiver for an electronic ballast of each discharge lamp and form a wireless network of the plurality of transceivers to allow reliable remote lighting control of the plurality of discharge lamps.

The foregoing object is achieved in one aspect of the present invention through the provision of a remote lighting control system for remote lighting control of a plurality of discharge lamps. The system includes a plurality of electronic ballasts, one provided for each discharge lamp, and each electronic ballast includes a transceiver which receives an external control command and a controller for exchanging control information with the transceiver. The control command includes identifiable information for identifying one of the plurality of electronic ballasts. The transceiver transfers the received control command to other electronic ballasts and includes a judging section for judging whether the identifiable information identifies the associated electronic ballast. If the identifiable information identifies the associated electronic ballast, the transceiver sends control information based on the received control command to the associated controller, causing the controller to control the discharge lamp in accordance with the control command.

The control command is a wireless signal of electromagnetic waves or the like propagated in space. Control information is a variety of information exchanged between the transceiver and the controller, such as a pulse width modulation (PWM) signal sent to a step-down chopper circuit included in the controller and a value of lamp current detected by a current sensor.

According to the present invention, when any of transceivers in the electronic ballasts receives a control command from the outside, for example, a control command from a transmitter or the like operated by the user, the transceiver further sends the received control command so that the control command is sent to all the transceivers in the wireless network. In that way, the control command can be sent to the target electronic ballast faster in comparison with a method of specifying an identification number and sending the control command to the single corresponding electronic ballast.

Remote lighting control can be performed without using a signal line, and the labor of installing signal lines can be eliminated. If a great number of discharge lamps are provided in a relatively wide area such as a factory, the range of remote control by the user is not limited to a narrow area, and a wide controllable range can be provided. A system that does not restrict the positions of discharge lamps can be provided.

It is preferred that a portable transmitter be provided and the transmitter include the identifiable information in the control command and send the control command. If the identifiable information identifies the associated electronic ballast, the transceiver may send control information based on the received control command to the associated controller. If the identifiable information does not identify the associated electronic ballast, the transceiver may send the received control command further to another electronic ballast.

Since the electronic ballast provided for each discharge lamp has the transceiver, a control command sent from the transmitter can be received by a transceiver, especially by the transceiver of an electronic ballast close to the transmitter. Since the transceiver has a judging section for judging, based on the identifiable information included in the control command, whether the control command was sent to the associated electronic ballast, a control command directed to another electronic ballast will not be taken by mistake. The transceiver further sends the control command directed to another electronic ballast, so that the control command can be sent to the identified electronic ballast. Thus, with the wireless network fanned by the plurality of electronic ballasts, a control command can be sent to the target electronic ballast.

The transmitter does not have to send the signal to all the electronic ballasts. The transmitter needs to send the signal to an electronic ballast in its vicinity. The electronic ballast in the vicinity may be the closest electronic ballast or one of the second to ninth closest electronic ballasts.

In the remote lighting control system of the present invention, it is preferred that the electronic ballast include a power supply circuit for the transceiver, which supplies part of power supplied from the controller to the transceiver; while the controller is generating a high-voltage pulse for starting or restarting the discharge lamp after power supply from the power source that supplies power to the electronic ballasts, to the controller of the electronic ballast starts, the transceivers of the electronic ballasts not form the wireless network of the plurality of transceivers; and the wireless network be formed after the discharge lamp enters the main discharge phase.

In the present invention, the high-voltage pulse is generated for dielectric breakdown of the discharge lamp to start the electrical discharge.

In some cases, when power is turned on to start the discharge lamp, a high-voltage pulse is applied to the discharge lamp directly before a control command is sent from the transmitter. If the wireless network is formed by turning the power on, the high-voltage pulse will affect the signal exchange between the transceivers, interfering with one transceiver's recognizing the other transceivers and the formation of the wireless network. According to the present invention, the wireless network is not formed while a high-voltage pulse is being generated but is formed after the lamp stable operation. Therefore, the effect of a high-voltage pulse can be avoided, and a control command can be exchanged reliably.

In the remote lighting control system of the present invention, it is preferred that the electronic ballast include a power supply circuit for the transceiver, which supplies part of power supplied from the controller to the transceiver; and the controller waits, without generating a high-voltage pulse, for a period of one to five seconds (both inclusive) after the transceiver starts forming the wireless network of the plurality of transceivers.

Since no high-voltage pulse is generated during the formation of the wireless network, according to the present invention, the effect of a high-voltage pulse can be avoided when the wireless network is formed.

In the remote lighting control system of the present invention, it is preferred that the control information includes dimming information allowing the controller to dim the discharge lamp; and the transceiver does not send the dimming information to the controller during a period of one to five minutes (both inclusive) after the starting of the discharge lamp.

In the present invention, the starting of the discharge lamp means a timing of the dielectric breakdown of the discharge lamp.

Luminous flux of the discharge lamp is decided according to the pressure in a luminous tube. So, starting time of the discharge lamp is needed until the luminous flux is stabilized. In the present invention, since the controller dims the discharge lamp after the stable operation, it will hardly extinguish the lamp, and the life of the discharge lamp does not become short.

In the remote lighting control system of the present invention, it is preferred that a current sensor for sensing lamp current of the discharge lamp be included; the transceiver includes a judging section for judging the lamp state, and the judging section judges whether the discharge lamp is ready for dimming in accordance with the value of the lamp current obtained from the current sensor; and, if the judging section for judging the lamp state judges that dimming is possible, the transceiver sends the dimming information to the controller.

Because the lamp state is judged by both the timer and the lamp current according to the present invention, the time period before the start of dimming can be reduced, and an energy saving effect can be obtained.

In the remote lighting control system of the present invention, it is preferred that the current sensor be used to detect extinction of the discharge lamps.

In the present invention, the extinction of the discharge lamp means that the discharge lamp does not operate even if the controller generates the high-voltage pulse to the lamp.

By using the current sensor for the two purposes, the system of the present invention can be prevented from becoming complex.

In the remote lighting control system of the present invention, it is preferred that the electronic ballast includes a storage unit for storing a dimming ratio of the discharge lamp; and, when the transceiver is activated, the transceiver includes dimming information based on the dimming ratio read from the storage unit, in the control information and sends the control information to the controller, and starts the dimming of the discharge lamp.

According to the present invention, the dimming value specified last can be restored, and the transceiver can start dimming independently, regardless of the formation of the wireless network.

The stored dimming ratio may be a dimming ratio sensed by a dimming sensor or the like and may also be a dimming ratio based on the dimming information sent from the transceiver to the controller in the most recent dimming operation.

In the remote lighting control system of the present invention, it is preferred that the plurality of electronic ballasts be divided into a plurality of groups, each containing at least one electronic ballast; each electronic ballast includes a group information storage section for storing the group information of the group to which the electronic ballast belongs and a group information operating section for changing the stored group information; the control command includes the group information; and each electronic ballast includes a judging section for judging whether the group information of the group to which the electronic ballast belongs agrees with the group information included in the received command information, and control the discharge lamps in accordance with the judgment made by the judging section for judging the group information.

It is preferred that the group information storage section and the group information operating section be DIP (Dual In-line Package) switches that can store and change the group information.

In the remote lighting control system of the present invention, it is preferred that the electronic ballast includes a power supply circuit for the transceiver, for supplying a direct current voltage of 10 to 25 V from the controller to the transceiver.

In the remote lighting control system of the present invention, it is preferred that the control information includes at least one of turning-on information, turning-off information, dimming information, extinction of lamps detection information, lighting frequency, and accumulated lamp operation time.

In the remote lighting control system of the present invention, it is preferred that the electronic ballast includes an indicator lamp for indicating by its lighting state, that is, on or off, whether power is supplied to the transceiver and a judgment section for judging a wireless signal state.

The judgment section judges whether transmission to or reception from the transceiver is possible. When the judgment section for judging the wireless signal state judges that transmission to or reception from the transceiver is possible, the indicator lamp be changed to the other lighting state, that is, off or on.

In the remote lighting control system of the present invention, it is preferred that the control command includes a turning-off command for turning off the discharge lamp; when the transceiver receives the control command, the value of the dimming ratio of the discharge lamp be changed gradually from the received value to such a value extinguishing the discharge lamp, and dimming information corresponding to the changing dimming ratio be sent to the controller; and the transceiver has the controller dim the illumination gradually until extinguishing the discharge lamp at the corresponding dimming ratio.

In the present invention, the dimming the illumination means an increase or a decrease of the luminous flux of the discharge lamp.

As described above, the electronic ballast provided for each discharge lamp has a specialized transceiver. When one of the transceivers receives a control command from the outside, the transceiver sends the control information based on the received control command to the associated controller and also sends the received control command further to allow transfer to the other electronic ballasts. This structure enables remote lighting control without using a signal line. Accordingly, the labor for installing of signal lines can be eliminated. Even if a great number of discharge lamps are placed in a relatively wide area such as a factory, the range of remote control by the user is not limited to a small area, and a wide controllable range can be provided. A system that does not limit the positions of the plurality of discharge lamps can be provided.

DESCRIPTION OF THE PREFERRED EMBODIMENT

A remote lighting control system according to a preferred embodiment of the present invention will be described below with reference to the drawings.

Figure 1:
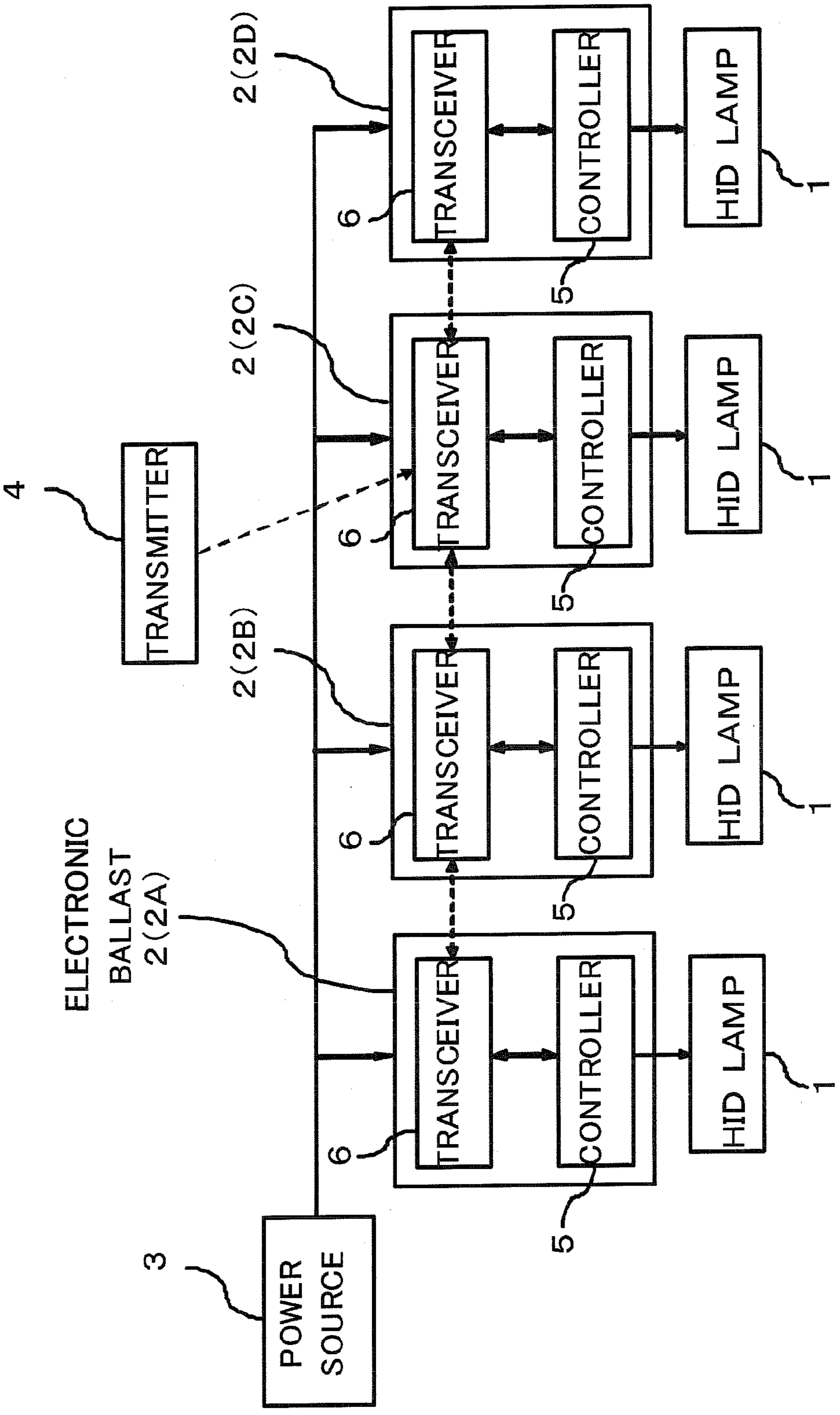
FIG. 1 is a block diagram of a remote lighting control system according to an embodiment of the present invention.

As shown in FIG. 1, the remote lighting control system performs remote control of lighting of a plurality of discharge lamps 1. The system includes the discharge lamps 1 such as high-intensity discharge (HID) lamps, electronic ballasts 2 provided for respective discharge lamps, a power source 3 for supplying power to the electronic ballasts 2, and a transmitter 4 for transmitting a control command to the electronic ballasts 2. Lighting control of the discharge lamps 1 includes turning on, turning off, and dimming of the discharge lamps 1, control after detection of extinction of the discharge lamps, control based on lighting frequency, and control based on accumulated lamp operation time, for instance.

The power source 3 and the electronic ballasts 2 are connected by power supply cables, through which power is supplied from the power source 3 to the electronic ballasts 2. The power source 3 has a main power switch that allows switching of power supply to all the electronic ballasts.

Each of the electronic ballasts 2 includes a controller 5 for controlling lamp current for lighting and a transceiver 6 for exchanging control information used to control lighting with the controller 5.

The control information includes at least one of turning-on information, turning-off information, dimming information, extinction of the lamp detection information, lighting frequency, and accumulated lamp operation time. As the turning-on information or dimming information, a pulse width modulation (PWM) waveform signal is used, for instance.

Structure of Electronic Ballast

The structure of the electronic ballast 2 that enables dimming by PWM will be described with reference to a block diagram shown in FIG. 2, as an example of the connection pattern between the controller 5 and transceiver 6 in the electronic ballast 2. The controller 5 includes a filter 51, a step-down chopper circuit 52, a full-bridge circuit 53, and a lamp operating circuit 54, which are connected in that order between the power source 3 and the discharge lamp 1. The step-down chopper circuit 52 limits power supplied from the power source 3 to an appropriate value of lamp current in accordance with the PWM waveform signal from the transceiver 6, and the discharge lamp 1 is dimmed accordingly.

The controller 5 also includes a power supply circuit 55 for transceiver, which supplies part of power supplied through the filter 51 to the transceiver 6. The power supply circuit 55 corresponds to a power supply unit for the transceiver of the present invention and supplies a direct current voltage of 10 to 25 V from the controller 5 to the transceiver 6.

The controller 5 is not limited to the one used for dimming. The controller 5 may perform normal turning on or turning off control or may be used for a variety of lighting control operations described above.

The transceiver 6 includes a dual in-line package (DIP) switch 61, a CPU 62, a wireless circuit 63, and an antenna 64.

The antenna 64 receives a control command sent from the transmitter 4 or any of the other electronic ballasts 2. The wireless circuit 63 reads information included in the control command received by the antenna 64 and transfers the information to the CPU 62. After receiving the instruction by the CPU 62 to transfer the received control command, the wireless circuit 63 transfers the received control command from the antenna 64 to the outside.

The control command is a modulated electromagnetic wave and includes a variety of command information required to control lighting of the discharge lamps 1.

The CPU 62 generates a PWM waveform signal necessary for dimming, for instance, on the basis of the command information read by the wireless circuit 63. The PWM waveform signal is generated by using a direct-current voltage from the power supply circuit 55 for the transceiver and is sent to the step-down chopper circuit 52 as control information.

The transceiver 6 sends control information based on the received control command to the associated controller 5 and transfers the received control command to another electronic ballast 2.

According to the present invention, when the transceiver 6 in any of the electronic ballasts 2 receives a control command from the outside, for example, from a transmitter operated by the user, the transceiver 6 further sends the received control command, so that all the transceivers 6 in the wireless network receives the control command. In that way, the control command can be sent to the target electronic ballast faster in comparison with a method of specifying an identification number and sending the control command to the single corresponding electronic ballast.

In this embodiment, lighting control can be performed in accordance with a control command that includes identifiable information.

Figure 2:
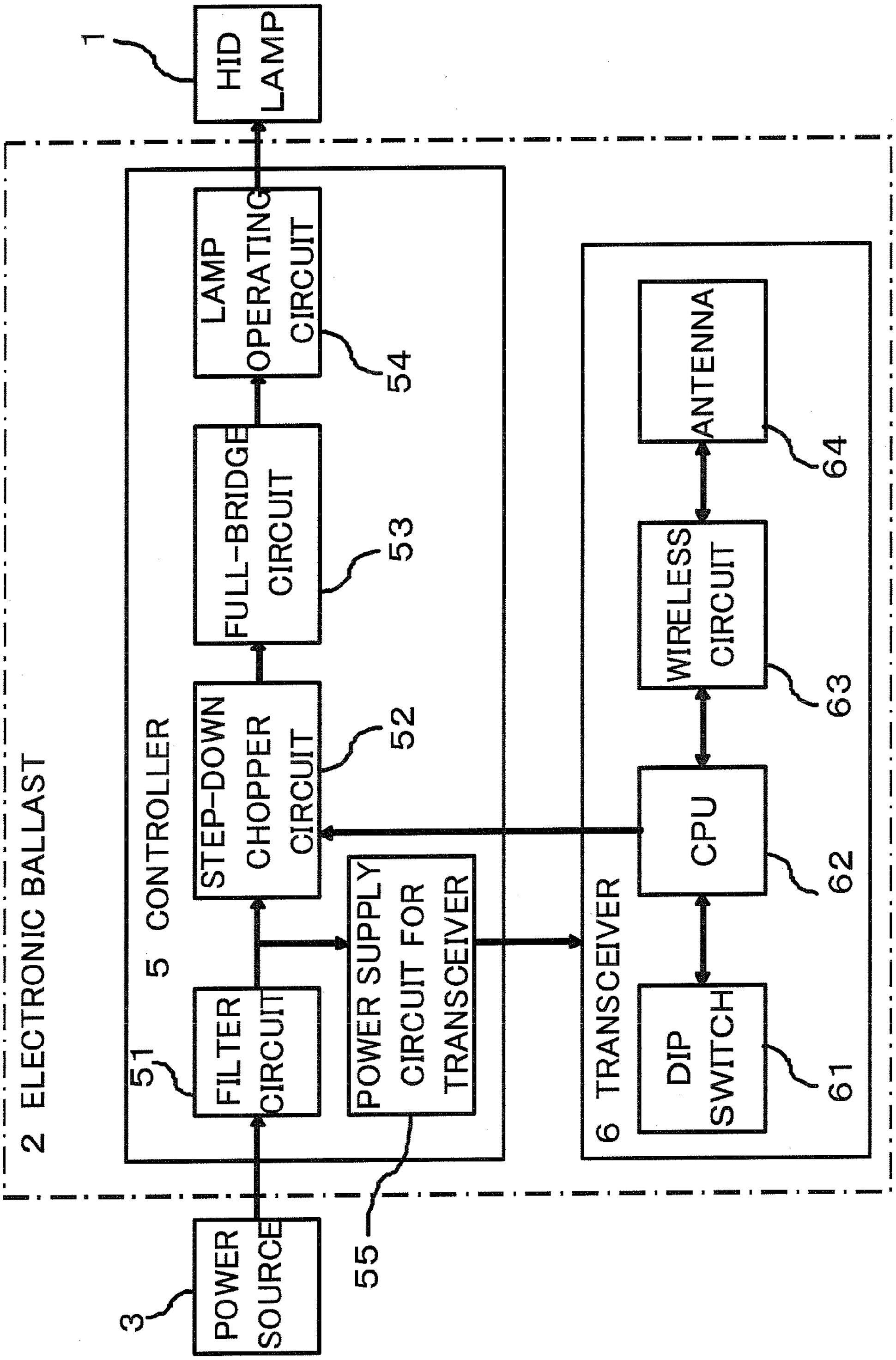
FIG. 2 is a block diagram of an electronic ballast in the system.

The transceiver 6 includes the DIP switch 61, as shown in FIG. 2. The DIP switch 61 stores the identifiable information of the associated electronic ballast 2. The identification number setting can be changed by operating the DIP switch 61. The specified identification number is read by the CPU 62.

The control command contains command information and identifiable information. The identifiable information agrees only with the identifiable information stored by the DIP switch 61 in a single electronic ballast 2. The identifiable information is added to the control command beforehand to be used to identify the electronic ballast 2 to which the control command should be sent. The identifiable information serves as the address information of the electronic ballast 2.

In the present invention, when the transceiver 6 receives a control command, the CPU 62 checks the identifiable information included in the control command to judge whether the control command is necessary for the associated electronic ballast 2. Since the identifiable information of the electronic ballast 2 is stored by the DIP switch 61 beforehand, the CPU 62 checks whether the identification number stored by the DIP switch 61 agrees with the identification number included in the control command. The CPU 62 functions as a first judging section for judging whether the identifiable information included in the control command identifies the associated electronic ballast 2. If the CPU 62 judges that the identifiable information identifies the associated electronic ballast 2, the PWM waveform signal, which has been described above, is generated.

If the identifiable information does not identify the associated electronic ballast 2, the CPU 62 instructs the wireless circuit 63 to transfer the received control command.

Because each electronic ballast 2 has one transceiver 6, when a certain electronic ballast 2A sends a control command, another electronic ballast 2B or more within the valid range of the control command receives the control command, and the CPU 62 in the electronic ballast 2B makes a judgment based on the identifiable information. If the destination of the control command is the electronic ballast 2D, the electronic ballast 2B further sends the control command. With this kind of transmission repeated on the wireless network formed by the transceivers 6 of the electronic ballasts 2, the control command can be reliably transferred to the destination electronic ballast 2D.

Transmitter

Figure 3:
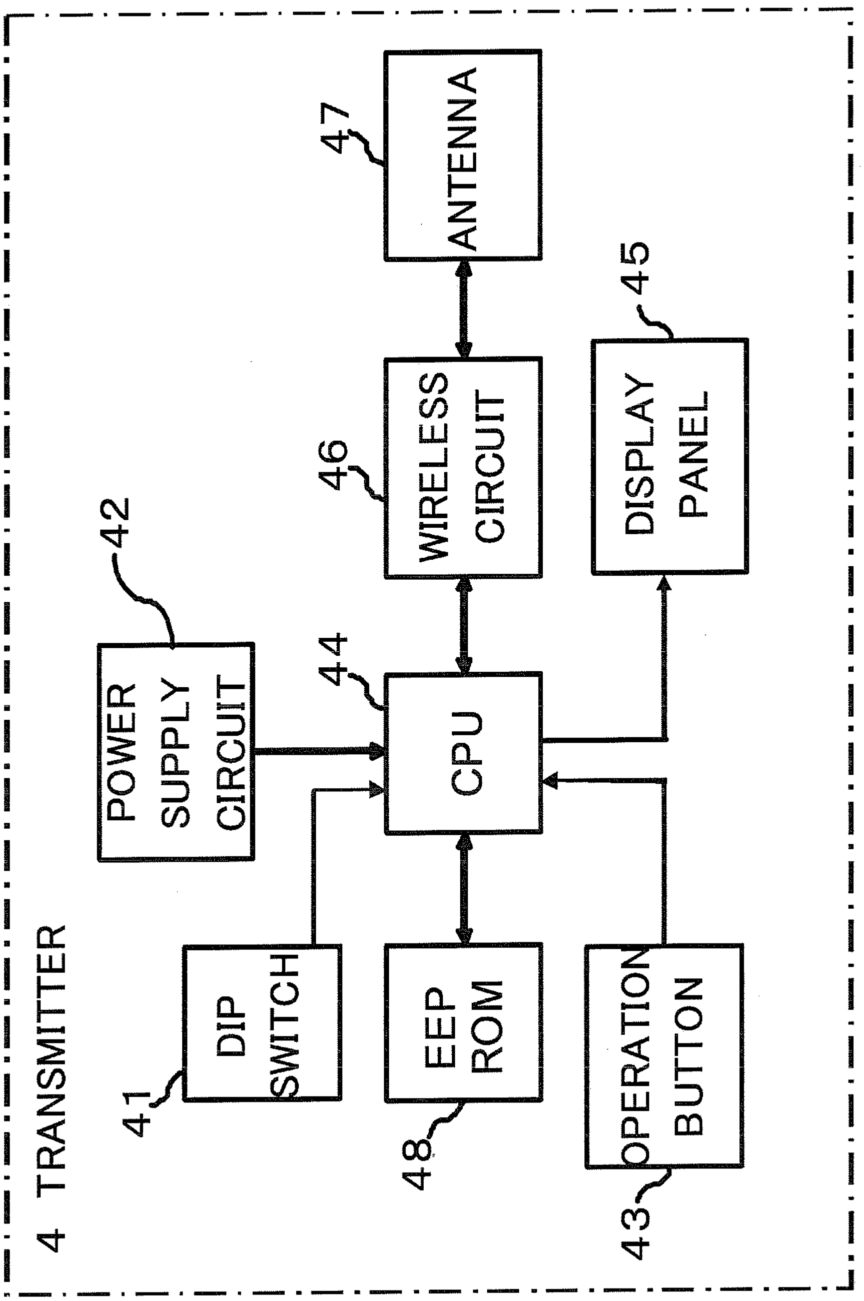
FIG. 3 is a block diagram of a transmitter in the system.

The structure of the transmitter 4 will next be described with reference to FIG. 3.

The transmitter 4 is portable and is used to send a desired control command to a target electronic ballast 2. The transmitter 4 can add identifiable information for identifying one of the electronic ballasts 2, to the control command. The transmitter 4 includes a DIP switch 41, a power supply circuit 42, operation buttons 43, a CPU 44, a display panel 45, a wireless circuit 46, an antenna 47, and an electronically erasable and programmable read only memory (EEPROM) 48. In this embodiment, the DIP switch 41 in the transmitter 4 stores a predetermined identifiable information item.

The power supply circuit 42 in the transmitter 4 supplies power to drive the CPU 44 and uses a battery or the like as the power source.

The operation buttons 43 are used to input information needed to specify a control command. The operation buttons 43 include a turning on/off button, a dim up/down button, and the like.

The CPU 44 generates a variety of information to be added to the control command, in accordance with the information input by the operation buttons 43. The information includes dimming information for changing the dimming ratio, a turning-off signal, and other command information. The CPU 44 reads the identifiable information stored by the DIP switch 41 and sends the information together with the generated command information to the wireless circuit 46, and displays the command information on the display panel 45.

The wireless circuit 46 sends the information provided from the CPU 44 as a control command through an antenna to the outside.

The transmitter 4 includes the EEPROM 48 for storing the generated command information. In this embodiment, the transmitter 4 is automatically turned off if the operation buttons 43 are not operated for a predetermined period of time. More specifically, if the CPU 44 does not receive any signal from the operation buttons 43 for the predetermined period of time, the most recently generated command information, such as dimming information, is stored in the EEPROM 48. The command information stored in the EEPROM 48 is overwritten by new command information only when the new information differs from the stored command information. Then, the supply of power from the power supply circuit 42 stops. When power to the CPU 44 is turned on again, the CPU 44 can read the command information stored in the EEPROM 48 and can send a control command even without new input from the operation buttons 43.

Flow of Control Command

The flow of the control command will be described by using the transmitter 4 structured as described above.

When new command information is generated by using the operation buttons 43, the CPU 44 instructs the wireless circuit 46 to send a radio-wave output request signal. An electronic ballast 2 receives the radio-wave output request signal and sends a response signal.

If the transmitter 4 receives the response signal from a plurality of electronic ballasts 2, the CPU 44 judges which response signal is received with the strongest power. In that way, the transmitter 4 can determine the electronic ballast 2 that is supposed to be within the closest range and can prepare for the transmission of a control command to the wireless network.

After the electronic ballast within the closet range is identified, the CPU 44 sends the command information stored in the EEPROM 48 and the identifiable information stored by the DIP switch 41 to the wireless circuit 46. The wireless circuit 46 sends these pieces of information as a control command through the antenna 47. The control command may not be received by the electronic ballast within the closet range but may be received by one of the electronic ballasts 2 within a close range.

By using the transmitter 4, the control command can be put on the wireless network reliably. Once the control command is put on the wireless network, the control command is sent to the target electronic ballast through the transfer on the wireless network.

In this embodiment, the electronic ballast 2 provided for each discharge lamp 1 has the transceiver 6, and the transmitter 4 does not have to send a control command to all the electronic ballasts 2. If the transmitter 4 just sends a control command to the electronic ballast 2 in the vicinity, the control command can be reliably sent to the target electronic ballast 2. Since secure remote lighting control can be performed without a signal line, the labor of installing signal lines can be eliminated. Even if a great number of discharge lamps are disposed in a relatively wide area such as a factory, the range of remote control by the user is not limited to a small area, and the controllable range can be expanded. Also, a system that does not restrict the positions of discharge lamps can be provided.

Figure 4:
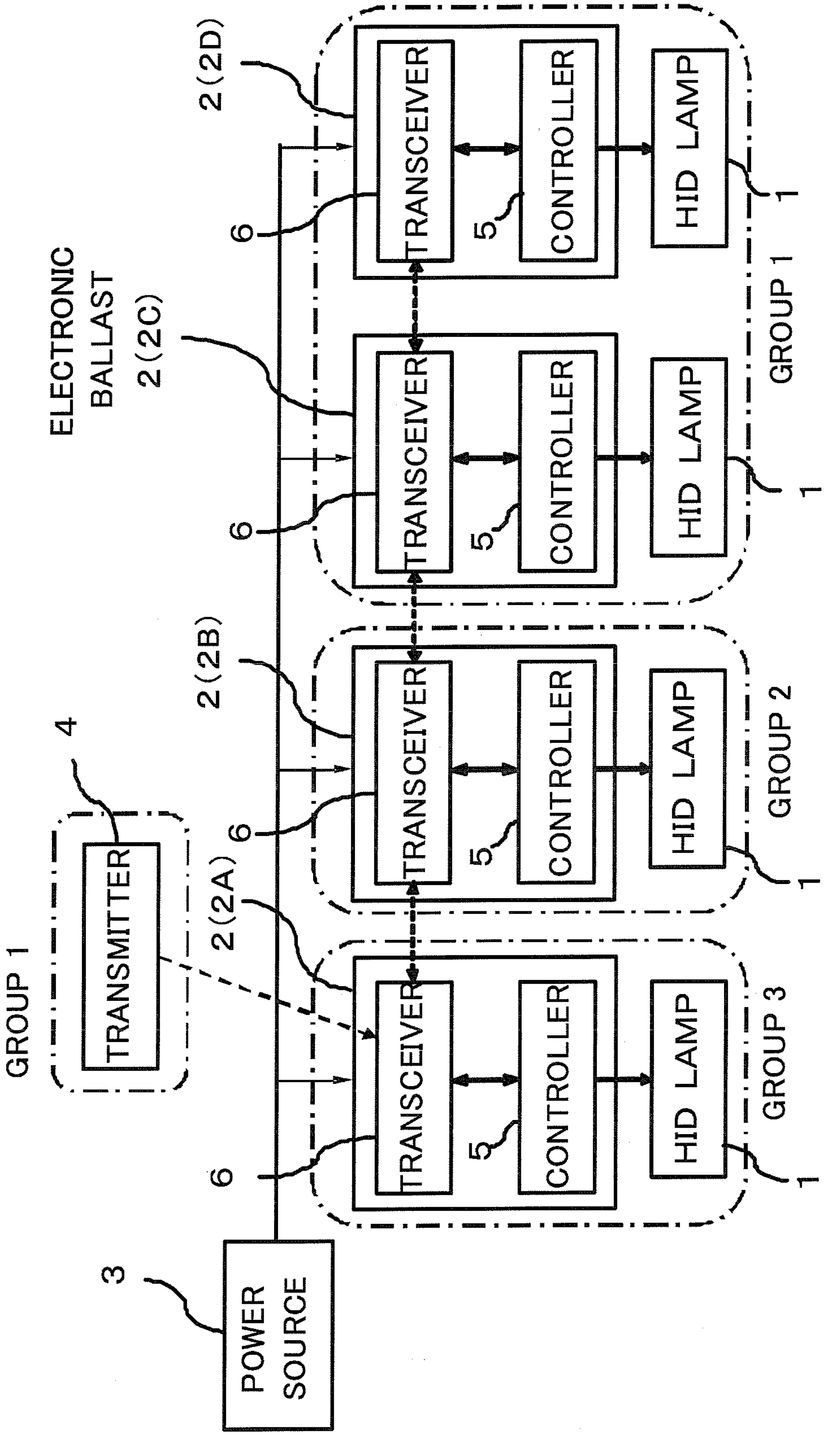
FIG. 4 is a block diagram illustrating a control method used when the electronic ballasts in the system are divided into groups.

By dividing the plurality of electronic ballasts 2 into a plurality of groups, each including at least one electronic ballast 2, as shown in FIG. 4, lighting can be controlled in groups.

The identifiable information stored by the DIP switch 61 of the transceiver 6 includes the group information of the group in which the electronic ballast 2 is included. For example, the identification number of the electronic ballast may begin with a number indicating the group information, so that the electronic ballast 2 has the group information. The DIP switch 61 corresponds to a component having the functions of a group information storage section and a group information operating section of the present invention.

The CPU 62 in the transceiver 6 may function as a second judging section for judging whether the group information of the electronic ballast 2 agrees with the group information included in the control command.

Like the DIP switch 61 in the transceiver 6, the DIP switch 41 in the transmitter 4 can be used to specify the group information of the group that includes the associated transmitter 4. The group information of the transmitter 4 is attached to the control command.

When a control command that includes the group information of Group 1 sent from the transmitter 4 is received by the electronic ballast 2A in Group 3 within the closest range, the CPU 62 in the electronic ballast 2A judges that the group information included in the control command does not agree with its own group information and transfers the control command. If the electronic ballast 2B in Group 2 receives the control command, the control command is transferred again, similarly to when a judgment is made based on the identifiable information. The control command finally reaches the electronic ballast 2C or electronic ballast 2D in target Group 1. By using the control command that includes the group information, a plurality of discharge lamps 1 can be collectively controlled in groups.

Avoiding the Effect of a High-Voltage Pulse

A control method for avoiding an adverse effect of a high-voltage pulse on the formation of the wireless network in this embodiment will be described next.

When the transceivers 6 are activated by power supplied from the power source 3 to the electronic ballasts 2, each transceiver 6 has to notify all other transceiver 6 of its existence. For that purpose, the transceivers 6 exchange signals. This forms the wireless network. The formation of the wireless network is completed when the existence of each transceiver 6 is recognized by all the other transceivers 6.

In some applications, all the discharge lamps 1 should be turned on immediately after power is supplied from the power source 3 to the controllers 5. The high-voltage pulse should be applied to the discharge lamps 1 before the wireless network is formed. In that case, the high-voltage pulse will adversely affect the formation of the wireless network, and all or part of the wireless network may not be formed normally.

In this embodiment, after the supply of power from the power source 3 to the controller 5 starts, the power supply circuit 55 for the transceiver does not supply power to the transceiver 6 while the controller 5 is generating a high-voltage pulse for starting or restarting of the discharge lamp 1. After the discharge lamp 1 enters the main discharge phase, the power supply circuit 55 for the transceiver supplies power to the transceiver 6, allowing the wireless network to be formed.

According to this embodiment, the wireless network is not formed while the high-voltage pulse is being generated. The wireless network is formed after lighting is stabilized. Therefore, the effect of a pulse can be avoided, and the wireless network can be formed normally.

If some of the transceivers 6 in the formed wireless network are not working, when those transceivers 6 are activated and added to the wireless network, the high-voltage pulse may affect the formation of the network.

In this embodiment, when the power supply circuit 55 supplies power to the transceiver 6 to add the transceiver 6 to the wireless network, no high-voltage pulse is generated during a period of one to five seconds (both inclusive) after the activation of the transceiver 6 starts.

Since the controller 5 waits without generating a high-voltage pulse until the activated transceiver 6 is added to the wireless network in this embodiment, the formation of the wireless network can be protected from the effect of the pulse, and the wireless network can be formed reliably.

Dimmer Control

The CPU 62 in the transceiver 6 does not send dimming information to the step-down chopper circuit 52 of the controller 5 for a period of one to five minutes (both inclusive) after the discharge lamp 1 is started.

The time period is measured by using the CPU 62 of the transceiver 6; therefore, a timer circuit is not needed at the controller 5, which enables a cost reduction.

The controller 5 has a current sensor for sensing lamp current. The CPU 62 of the transceiver 6 judges from the value of lamp current obtained from the current sensor whether dimming of the discharge lamp 1 is possible. The CPU 62 functions also as a third judging section for judging the lamp state. If the CPU 62 judges that the lamp state permits dimming, the dimming information is sent to the step-down chopper circuit 52.

Since the judgment is made based not only on the timer but also on the lamp current in this embodiment, the time period before the start of dimming is reduced, and the energy saving effect can be improved.

The current sensor is also used as a sensor for detecting not lighting of the discharge lamps.

Dimmer Control Using Stored Dimming Ratio

The transceiver 6 includes a storage unit, which is not shown, for storing previous dimming ratios.

When the transceiver 6 is activated, the CPU 62 sends control information that includes dimming information based on the dimming ratio read from the storage unit to the controller and starts dimming of the discharge lamp. When power is supplied to the electronic ballast 2, the dimming value specified last can be restored, and the transceiver 6 can start dimming independently before the wireless network is formed. The dimming ratio stored here may be a dimming ratio sensed by a dimming sensor or the like and may also be a dimming ratio based on the dimming information sent from the transceiver 6 to the controller 5 in the last dimming operation.

Displaying the Wireless Signal State

The electronic ballast 2 has an indicator lamp, which is not shown, for indicating by its lighting state, that is, lighting-on or lighting-off, whether power is supplied from the power supply circuit 55 to the transceiver 6 and a judgment unit for judging whether the wireless signal state allows transmission to or reception from the transceiver 6.

The CPU 62 of the transceiver 6 in this embodiment functions as a section for judging the wireless signal state. If the CPU 62 judges that transmission to or reception from the transceiver 6 is possible, the indicator lamp is changed to the other lighting state, that is, off or on.

Turning-off Control

The control commands in this embodiment include a turning-off command for turning off the discharge lamp 1.

Figure 5:
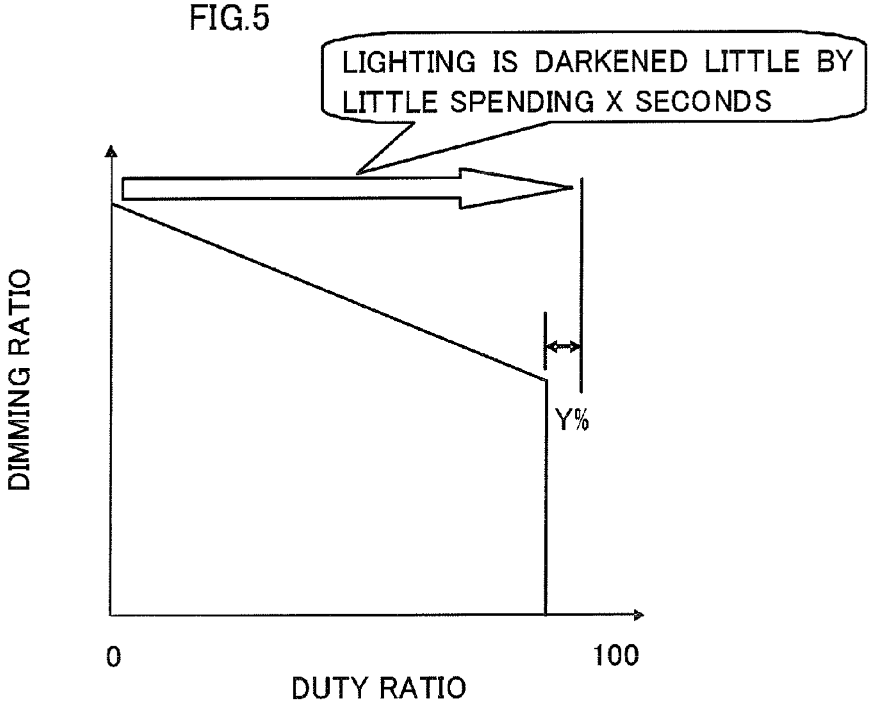
FIG. 5 is a diagram illustrating a control method by which a discharge lamp is turned off in the system.
Figure 6:
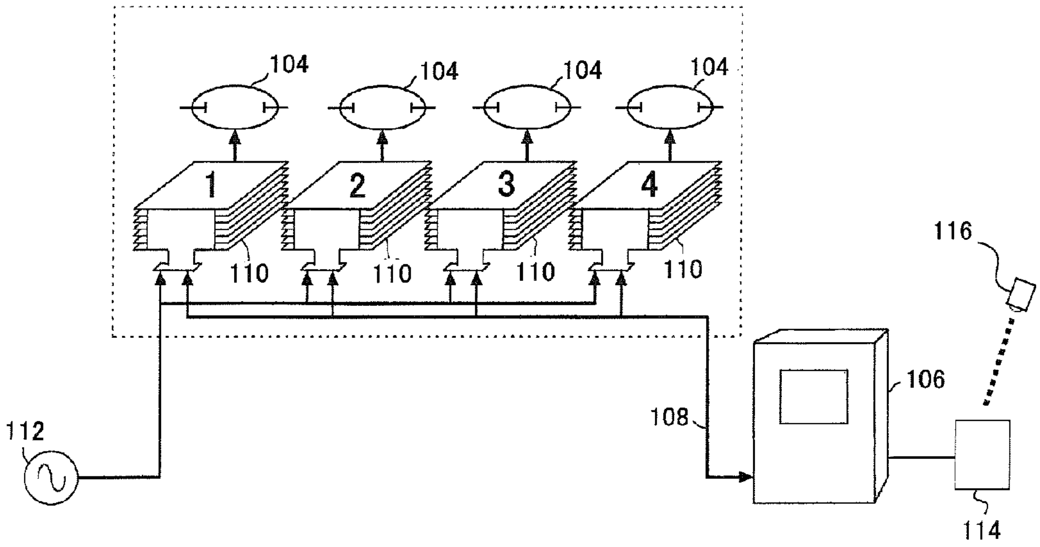
FIG. 6 is a block diagram of a conventional remote lighting control system.

When the transceiver 6 receives a control command, the CPU 62 changes the value of the dimming ratio for the discharge lamp 1 gradually from the received value to a value that the discharge lamp 1 goes off, as shown in FIG. 5. The dimming information corresponding to the varying dimming ratio is sent to the controller 5, and the illumination is dimmed gradually. More specifically, the duty ratio corresponding to the dimming ratio is changed from 0% to 100% over a predetermined period (X seconds). The dimming ratio causing discharge lamp to go off is set to a predetermined duty ratio, such that Y % before 100% (100%−Y %). The discharge lamp 1 is turned off completely at the dimming ratio causing the discharge lamp to go off. To go off of the discharge lamp means extinguishing the discharge lamp.

For avoiding a flicker by the sudden change of the luminous flux, the X seconds is preferably set to a period of 2 to 30 seconds and the Y % is preferably set to 20%.

The system in this embodiment uses the transmitter 4, which is portable and sends a control command by using the wireless network. The transmitter may be connected to one of the electronic ballasts 2 by a wire and may send a control command by a method other than wirelessly.

The remote lighting control system according to the present invention can be used as a remote control system for controlling a plurality of discharge lamps disposed in a relatively wide area such as a factory and a shopping mall.

What is claimed is:

1. A remote lighting control system for remote lighting control of a plurality of lamps, the system comprising:

a plurality of electronic circuits for controlling lamp current of the plurality of lamps, each of said plurality of electronic circuits being associated with one of said plurality of lamps, wherein each of said electronic circuits comprises:

a transceiver for receiving an external control command; and a controller for exchanging control information with the transceiver;

wherein the external control command includes identifiable information for identifying at least one of said plurality of electronic circuits associated with one of said plurality of lamps, and wherein each transceiver:

(a) forms a wireless network with other transceivers of the system;

(b) transfers received external control commands to other electronic circuits of the system via the wireless network; and (c) includes a judging section for judging whether the identifiable information identifies the electronic circuit associated with the lamp, and if the identifiable information identifies the electronic circuit associated with the lamp, sends control information based on the received external control command to the associated controller, causing the controller to control the lamp in accordance with the control command, wherein each of the plurality of electronic circuits further comprises a power supply circuit for the transceiver, which does not supply power to the transceiver while the controller is generating a high-voltage pulse for starting or restarting the lamp thereby preventing formation of the wireless network while the high-voltage pulse is being generating by the controller, and wherein after lighting is stabilized and the high-voltage pulse is no longer being generated, the power supply circuit for the transceiver supplies power to the transceiver and the wireless network can be formed.

2. The remote lighting control system according to claim 1, further comprising:

a portable transmitter which includes the identifiable information in the control command and which sends the control command.

3. The remote lighting control system according to claim 1, wherein the controller waits, without generating a high-voltage pulse for starting or restarting of the lamp, for a period of one to five seconds after the transceiver starts forming the wireless network of the plurality of transceivers.

4. The remote lighting control system according to claim 3, wherein the control information includes dimming information allowing the controller to dim the lamp; and wherein the transceiver does not send the dimming information to the controller during a period of one to five minutes after the lamp is started.

5. The remote lighting control system according to claim 3, further comprising;

a current sensor for sensing lamp current of the lamp;

wherein the judging section judges a lamp state, and the judging section judges whether the lamp is ready for dimming in accordance with a value of the lamp current obtained from the current sensor; and if the judging section for judging the lamp state judges that dimming is possible, the transceiver send the dimming information to the controller.

6. The remote lighting control system according to claim 5, wherein the current sensor can detect extinction of the lamps.

7. The remote lighting control system according to claim 4, wherein each of the plurality of electronic circuits further includes a storage unit for storing a dimming ratio of the lamp; and when the transceiver is activated, the transceiver includes dimming information based on the dimming ratio read from the storage unit, in the control information and sends the control information to the controller, and starts a dimming of the lamp.

8. The remote lighting control system according to claim 7, wherein the plurality of electronic circuits are divided into a plurality of groups, each containing at least one electronic circuit; and each electronic circuit includes a group information storage section for storing the group information of the group to which the electronic circuit belongs and a group information operating section for changing the stored group information; and the control command includes the group information; and the judging section of each electronic circuit judges whether the group information of the group to which the electronic circuit belongs agrees with the group information included in the received command information, and the lamp is controlled in accordance with the judgment made by the judging section for judging the group information.

9. The remote lighting control system according to claim 8, wherein the group information storage section and the group information operating section are DIP switches that can store and change the group information.

10. The remote lighting control system according to claim 9, wherein the power supply circuit for the transceiver of each of the plurality of electronic circuits supplies a direct current voltage of 10 to 25 V from the controller to the transceiver.

11. The remote lighting control system according to claim 10, wherein the control information includes at least one of turning-on information, turning-off information, dimming information, extinction of lamps detection information, lighting frequency, and accumulated lamp operation time.

12. The remote lighting control system according to claim 11, wherein the electronic circuit including the transceiver and the controller further includes an indicator lamp with two lighting states of lighting-on and lighting-off for indicating by the lighting states whether power is supplied to the transceiver; and wherein the judgment section judges a wireless signal state and whether transmission to or reception from the transceiver is possible; and when the judgment section for judging the wireless signal state judges that transmission to or reception from the transceiver is possible, the indicator lamp is changed to the other lighting state.

13. The remote lighting control system according to claim 12, wherein the control command includes a turning-off command for turning off the lamp; and when the transceiver receives the control command, the value of the dimming ratio of the lamp is changed gradually from the received value to such a value extinguishing the lamp; and dimming information corresponding to the changing dimming ratio is sent to the controller; and the transceiver has the controller dim the illumination gradually until extinguishing the lamp at the corresponding dimming ratio.

* * * * *